(12) United States Patent
Iashyn et al.

(10) Patent No.: US 11,562,176 B2
(45) Date of Patent: Jan. 24, 2023

(54) IOT FOG AS DISTRIBUTED MACHINE LEARNING STRUCTURE SEARCH PLATFORM

(71) Applicant: Cisco Technology, Inc., San Jose, CA (US)

(72) Inventors: Volodymyr Iashyn, Brussels (BE); Gonzalo Salgueiro, Raleigh, NC (US); M. David Hanes, Lewisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 1008 days.

(21) Appl. No.: 16/282,781

(22) Filed: Feb. 22, 2019

(65) Prior Publication Data
US 2020/0272859 A1    Aug. 27, 2020

(51) Int. Cl.
| | |
|---|---|
| *G06K 9/62* | (2022.01) |
| *G06N 20/00* | (2019.01) |
| *G06F 9/48* | (2006.01) |
| *H04L 67/60* | (2022.01) |

(52) U.S. Cl.
CPC ......... *G06K 9/6262* (2013.01); *G06F 9/4881* (2013.01); *G06N 20/00* (2019.01); *H04L 67/60* (2022.05)

(58) Field of Classification Search
CPC .... G06K 9/6262; G06N 20/00; G06F 9/4881; H04L 67/32
See application file for complete search history.

(56) References Cited

U.S. PATENT DOCUMENTS

| | | | |
|---|---|---|---|
| 9,547,828 B2 | 1/2017 | Mermoud et al. | |
| 10,380,498 B1 * | 8/2019 | Chaoji | G06N 7/005 |
| 10,700,935 B1 * | 6/2020 | Mousavi | G06F 11/3476 |

(Continued)

FOREIGN PATENT DOCUMENTS

WO    WO-2020028440 A1 *    2/2020    ............. G06F 17/18

OTHER PUBLICATIONS

Mohammadi, Mehdi, et al., "Deep Learning for IoT Big Data and Streaming Analytics: A Survey," Jun. 6, 2018, pp. 1-40.

(Continued)

*Primary Examiner* — Jonathan A Bui
(74) *Attorney, Agent, or Firm* — Polsinelli

(57) ABSTRACT

Systems, methods, and computer-readable mediums for distributing machine learning model training to network edge devices, while centrally monitoring training of the models and controlling deployment of the models. A machine learning model architecture can be generated at a machine learning structure controller. The machine learning model architecture can be deployed to network edge devices in a network environment to instantiate and train a machine learning model at the network edge devices. Performance reports indicating performance of the machine learning model at the network edge devices can be received by the machine learning structure controller from the network edge devices. The machine learning structure controller can determine whether to deploy another machine learning model architecture to the network edge devices based on the performance reports and subsequently deploy the another architecture to the network edge devices if it is determined to deploy the architecture based on the performance reports.

20 Claims, 9 Drawing Sheets

(56) References Cited

U.S. PATENT DOCUMENTS

| | | | |
|---|---|---|---|
| 2017/0048308 A1 | 2/2017 | Qaisar | |
| 2017/0220407 A1* | 8/2017 | Estrada | G06F 11/3495 |
| 2018/0337820 A1 | 11/2018 | Chen et al. | |
| 2019/0042878 A1* | 2/2019 | Sheller | G06F 21/6245 |
| 2019/0199602 A1* | 6/2019 | Zhang | G06N 3/0445 |
| 2020/0027033 A1* | 1/2020 | Garg | H04L 67/22 |
| 2020/0151619 A1* | 5/2020 | Mopur | G06N 5/047 |
| 2022/0052925 A1* | 2/2022 | Vandikas | G06N 3/04 |

OTHER PUBLICATIONS

Omoniwa, Babatunji, et al., "Fog/Edge Computing-based IoT (FECIoT): Architecture, Applications, and Research Issues," Oct. 11, 2018, pp. 1-33.

* cited by examiner

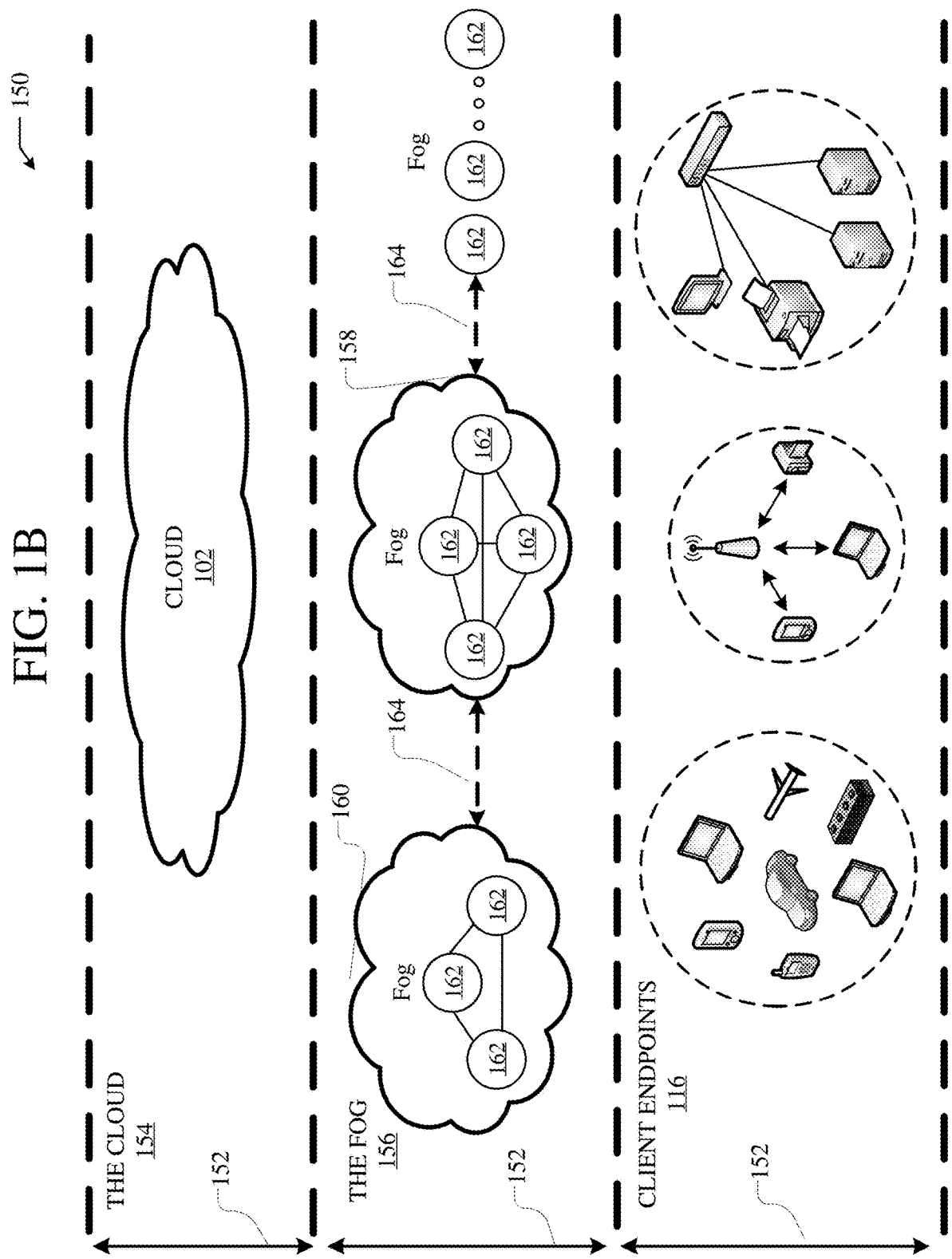

IOT FOG AS DISTRIBUTED MACHINE LEARNING STRUCTURE SEARCH PLATFORM

TECHNICAL FIELD

The present technology pertains to distributing machine learning to network edge devices, and in particular to distributing machine learning model training to network edge devices, while centrally monitoring training of the models and centrally controlling deployment of the models to the network edge devices.

BACKGROUND

Computing nodes in a network environment, e.g. network edge devices, are increasingly using machine learning models to control operation of the nodes and monitor performing of the nodes in the network environment. In particular, machine learning models are trained on telemetry data from computing nodes, e.g. Internet of Things ("IoT") devices, and are configured to act on such telemetry data, e.g. for use in operation of the computing nodes. However, training such models requires a large amount of computational resources. In particular, cloud data centers do not allow for effective centralized training of machine learning models deployed in fog networks due to scaling limits or connectivity restrictions. There therefore exit needs for systems and methods of distributing machine learning model training to network edge devices.

Additionally, telemetry data from computing nodes, e.g. IoT devices, is typically used to train machine learning models, e.g. for monitoring networks. This is problematic when the machine learning models are trained at a centralized location away from a network edge. In particular, the telemetry data is sent from the computing nodes away from the edge of the network, potentially exposing the telemetry data. This presents security concerns that often preclude device owners from sharing telemetry data with outside parties. There therefore exist needs for systems and methods of training machine learning models without exposing telemetry data of computing nodes used to train the machine learning models.

While it is beneficial to distribute machine learning model training to network edge devices, it is difficult to monitor performance of the machine learning models in a distributed manner. Specifically, it is difficult for the network edge devices themselves to effectively evaluate candidate machine learning model deployment and training across the different network edge devices. Additionally, network edge devices in a distributed machine learning model training environment have difficulties determining what machine learning models to actually deploy across the environment based on actual model training in the environment. Specifically, network edge devices have difficulties in performing data pipeline architecture searches, e.g. AutoML, for determining new candidate models to deploy into the distributed learning environment based on actual training of models in the environment. There therefore exist needs for systems and methods of centrally monitoring and controlling model training across network edge devices.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1B illustrates an example fog computing architecture;

DESCRIPTION OF EXAMPLE EMBODIMENTS

Figure 1A:
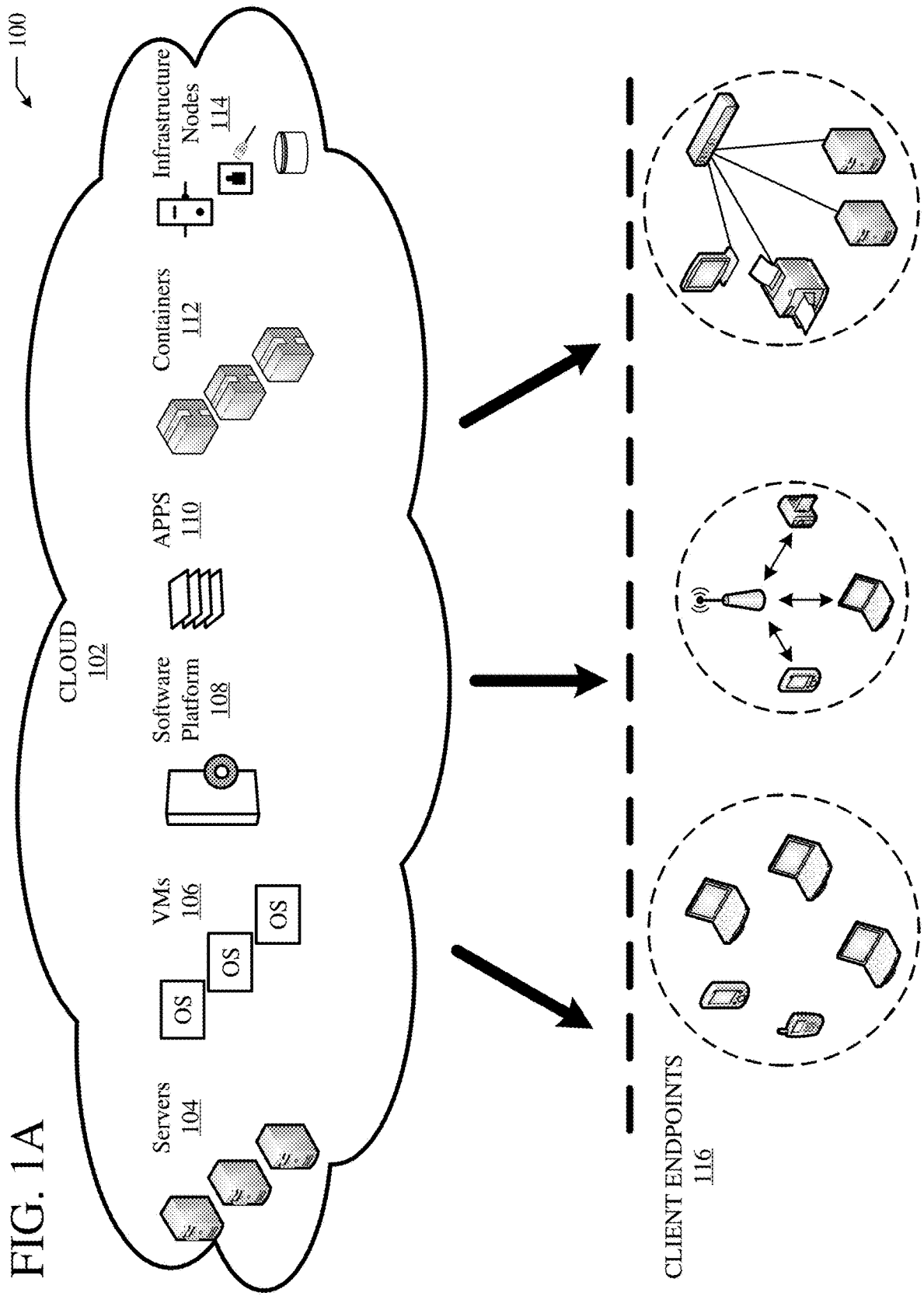
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include generating, at a machine learning structure controller, a machine learning model architecture to send to network edge devices in a network environment. The machine learning model architecture can be deployed to the network edge devices such that the network edge devices can use the machine learning model architecture to instantiate and train a machine learning model at the network edge devices in the network environment. Further, the machine learning structure controller can receive, from the network edge devices, performance reports indicating performance of the machine learning model at the network edge devices. Additionally, it can be determined whether to deploy another machine learning model architecture to the network edge devices based on the performance reports of the machine learning model received from the network edge devices. Subsequently, the another machine learning model architecture can be deployed to the network edge devices if it is determined to deploy the another machine learning model architecture to the network edge devices based on the performance reports.

A system can include one or more processors and at least one computer-readable storage medium storing instructions which, when executed by the one or more processors, cause the one or more processors to generate, at a machine learning structure controller, a machine learning model architecture to send to network edge devices, including IoT devices, in a network environment. The instructions can cause the one or more processors to deploy the machine learning model architecture to the network edge devices such that the network edge devices can utilize the machine learning model architecture to instantiate and train a machine learning model at the network edge devices in the network environment. Further, the instructions can cause the machine learning structure controller to receive, from the network edge devices, performance reports indicating performance of the machine learning model at the network edge devices. The instructions can also cause the one or more processors to determine whether to deploy another machine learning model architecture to the network edge devices based on the performance reports of the machine learning model received from the network edge devices. The instructions can subsequently cause deployment of the another machine learning model architecture to the network edge devices if it is determined to deploy the another machine learning model architecture to the network edge devices based on the performance reports.

A non-transitory computer-readable storage medium having stored therein instructions which, when executed by a processor, cause the processor to generate, at a machine learning structure controller, a machine learning model architecture to send to network edge devices in a network environment. The instructions can also cause the processor to deploy the machine learning model architecture to the network edge devices such that the network edge devices can utilize the machine learning model architecture to instantiate and train a machine learning model at the network edge devices in the network environment. The instructions can also cause the machine learning structure controller to receive, from the network edge devices, performance reports indicating performance of the machine learning model at the network edge devices. Further, the instructions can cause the processor to determine whether to deploy another machine learning model architecture to the network edge devices based on the performance reports of the machine learning model received from the network edge devices. The another machine learning model architecture can include an architecture for a different machine learning model than the machine learning model already instantiated at the network edge devices. The instructions can also cause the processor to deploy the another machine learning model architecture to the network edge devices if it is determined to deploy the another machine learning model architecture to the network edge devices based on the performance reports.

Example Embodiments

The disclosed technology addresses the need in the art for distributing machine learning to edges of a network, while centrally monitoring training at the network edge and centrally controlling deployment of the models to the network edge. Additionally, the disclosed technology address the need in the art for centrally monitoring training of machine learning models at network edge devices using telemetry data without exposing the telemetry data outside of the network edge. The present technology involves system, methods, and computer-readable media for distributing machine learning model training to network edge devices, while centrally monitoring training of the models and centrally controlling deployment of the models. Additionally, the present technology involves systems, methods, and computer-readable media for centrally monitoring model training at network edge devices using telemetry data without exposing the telemetry data outside of the network edge.

Figure 3:
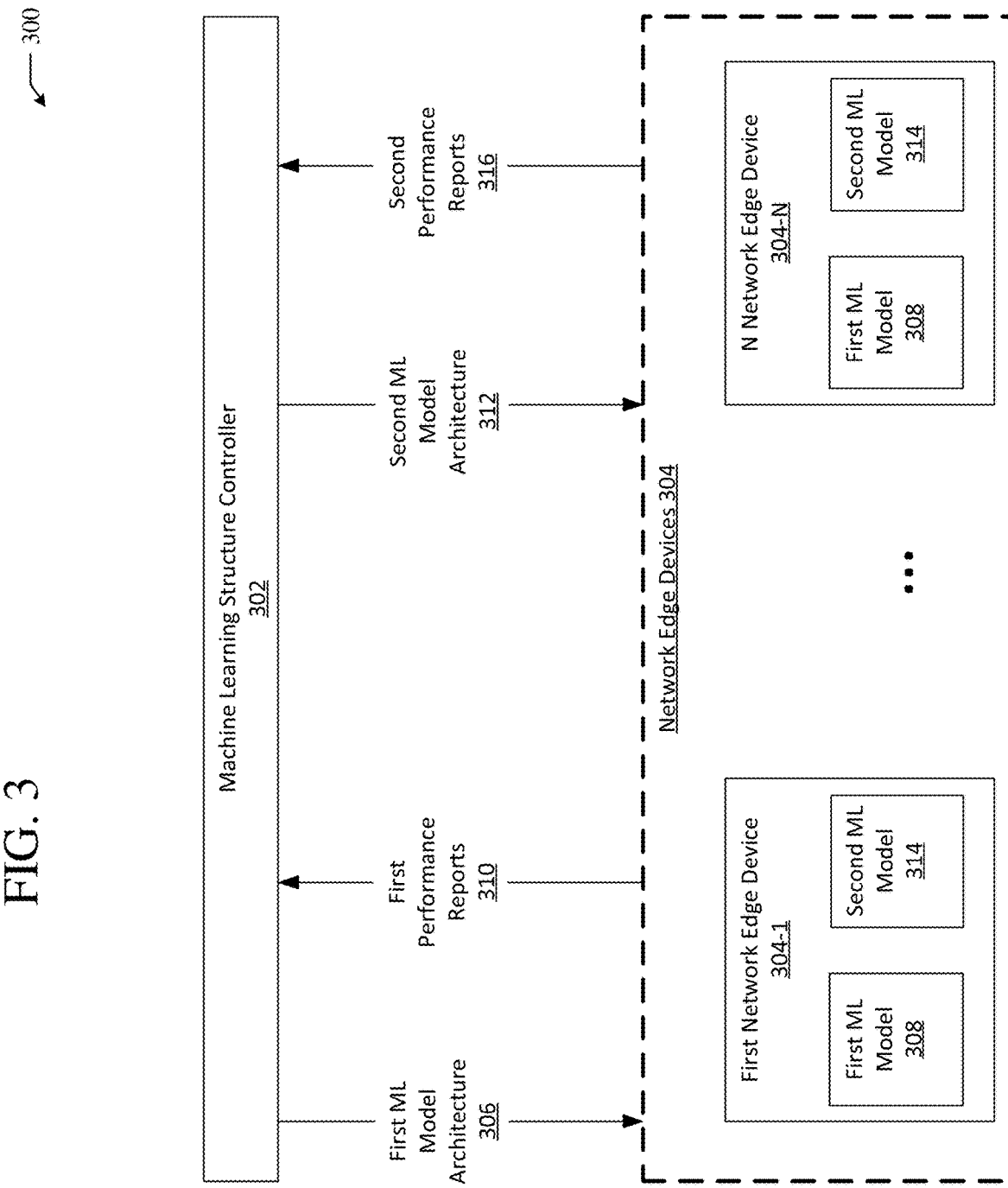
FIG. 3 illustrates an example environment for distributing machine learning to edges of a network.
Figure 4:
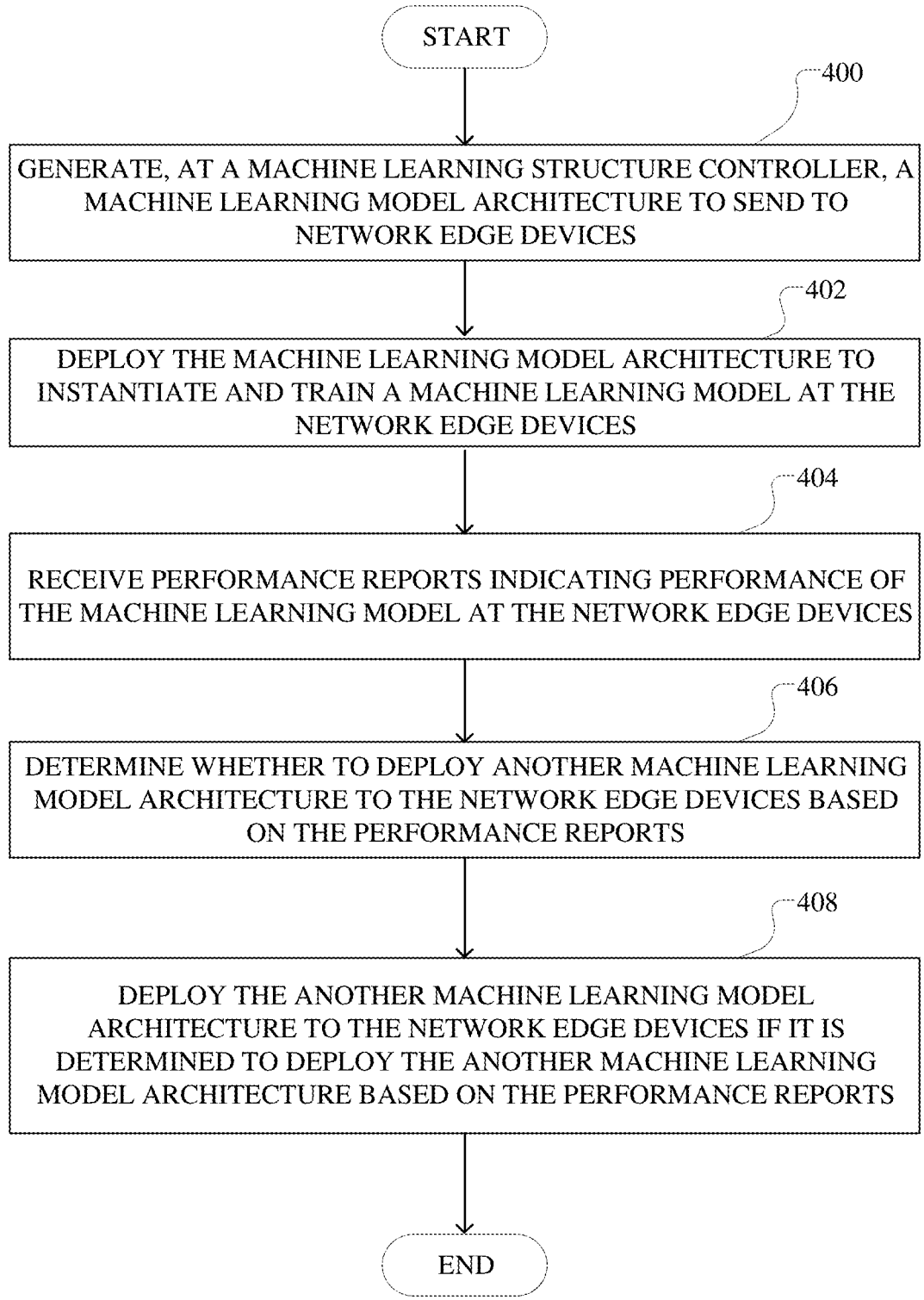
FIG. 4 illustrates a flowchart for an example method of distributing machine learning to a network edge while centrally controlling the machine learning remote from the network edge.
Figure 5:
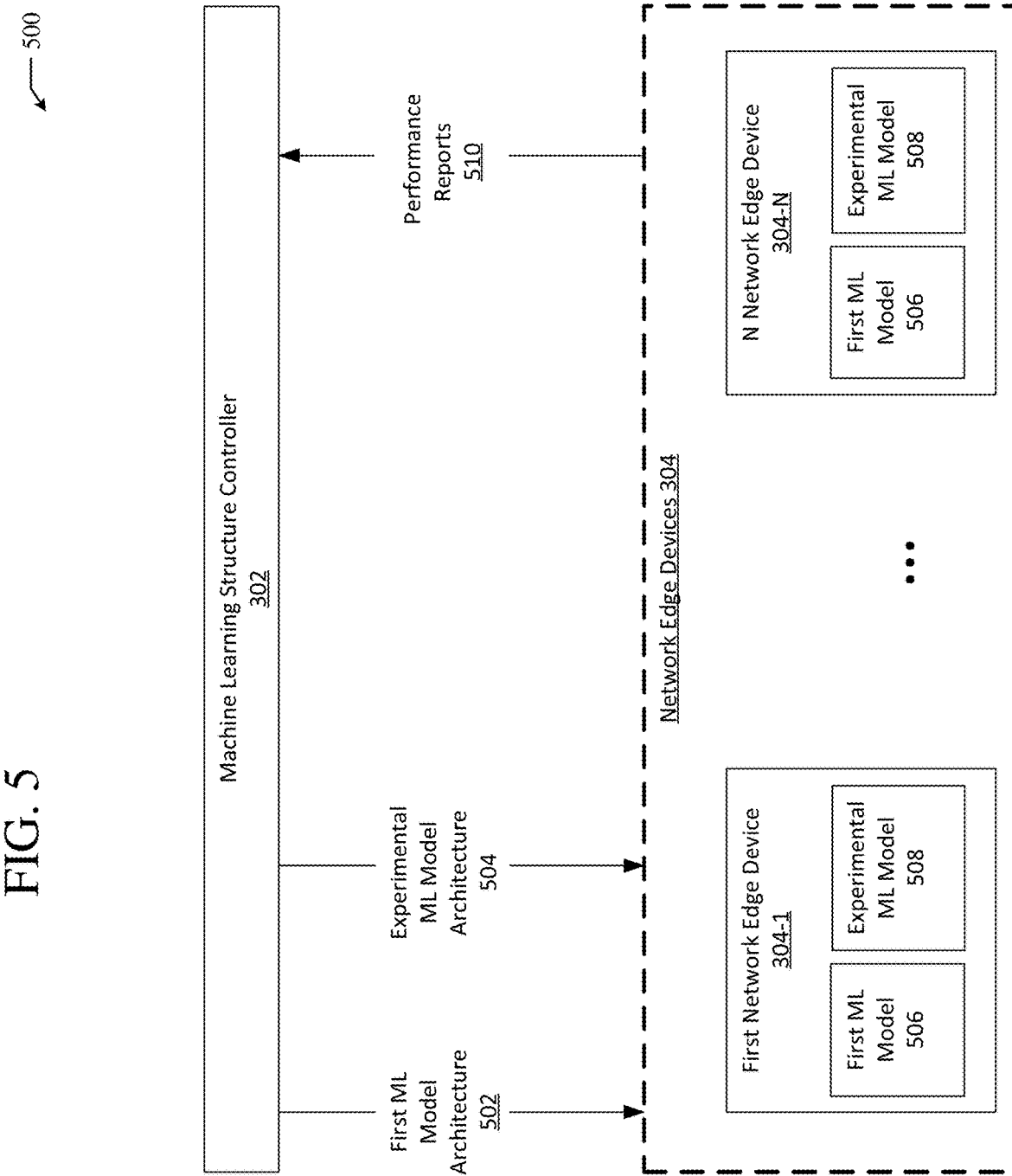
FIG. 5 illustrates an example environment for distributing machine learning to edges of a network using experimental machine learning models.
Figure 6:
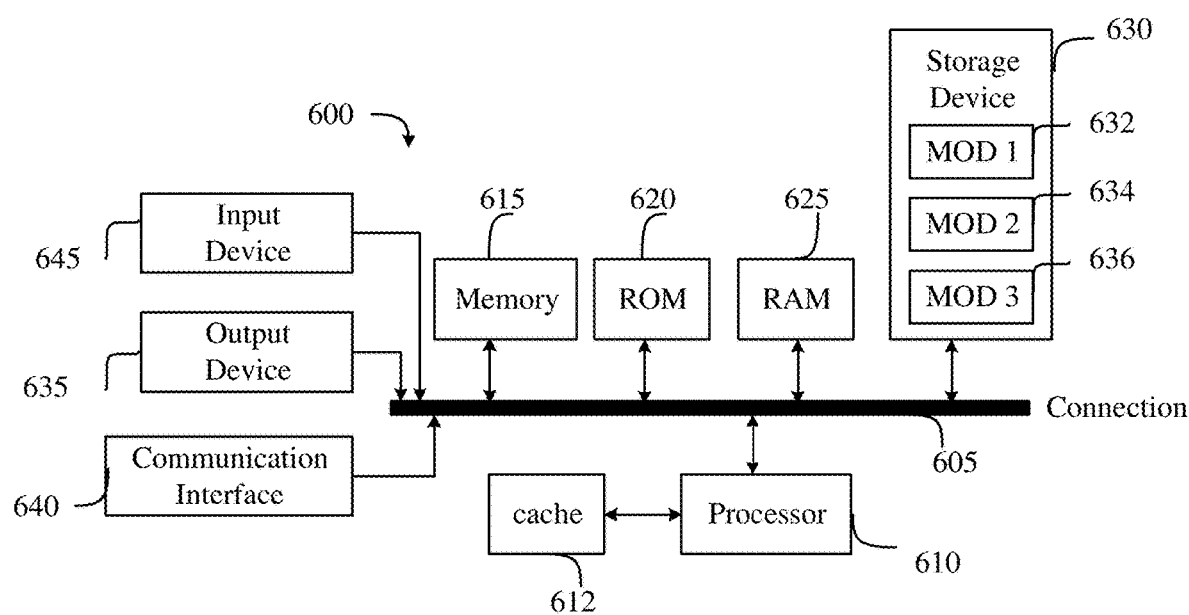
FIG. 6 illustrates an example computing system.
Figure 7:
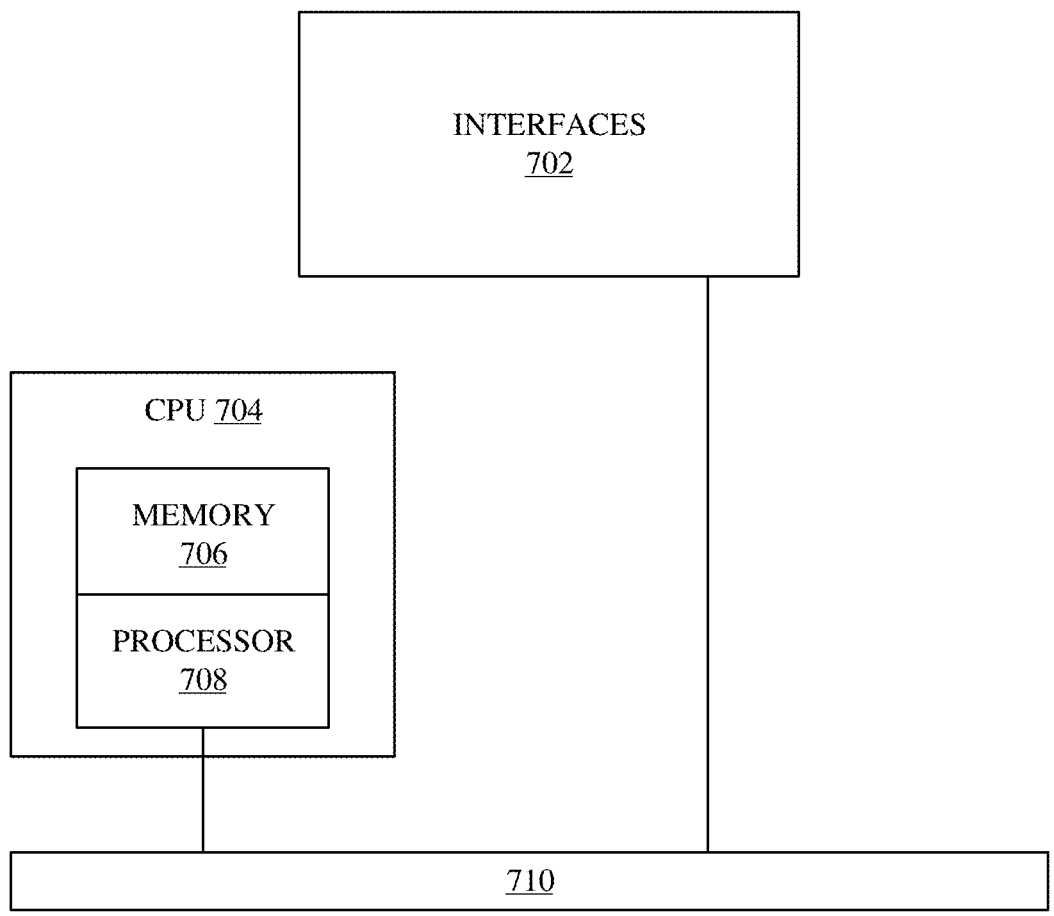
FIG. 7 illustrates an example network device.

A description of network environments and architectures for network data access and services, as illustrated in FIGS. 1A, 1B, 2A, 2B is first disclosed herein. A discussion of systems, methods, and computer-readable medium for distributing machine learning to network edge devices, as shown in FIGS. 3-5, will then follow. The discussion then concludes with a brief description of example devices, as illustrated in FIGS. 6 and 7. these variations shall be described herein as the various embodiments are set forth. The disclosure now turns to FIG. 1A.

FIG. 1A illustrates a diagram of an example cloud computing architecture 100. The architecture can include a cloud 102. The cloud 102 can be used to form part of a TCP connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2A:
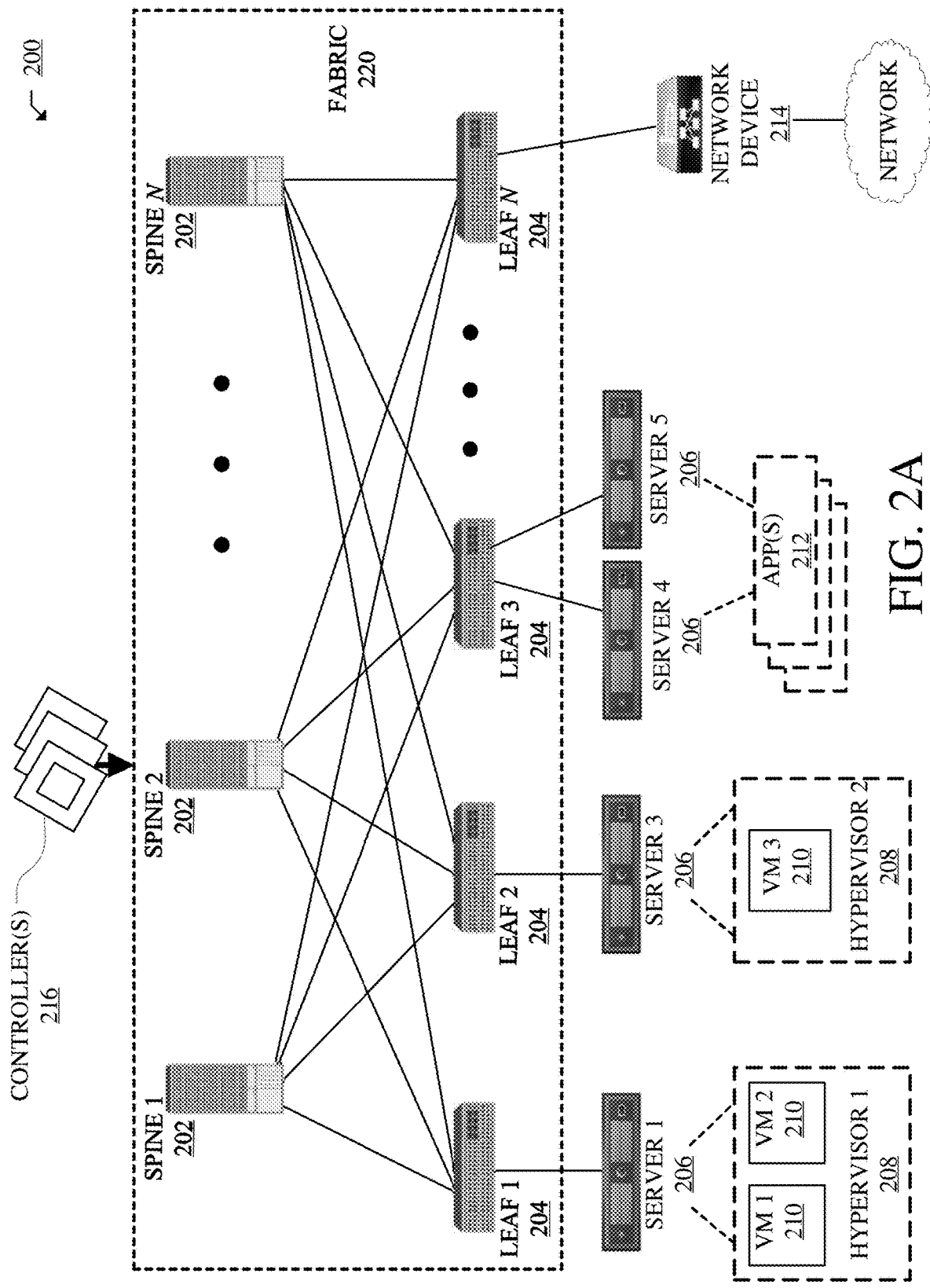
FIG. 2A illustrates a diagram of an example network environment, such as a data center.

FIG. 2A illustrates a diagram of an example Network Environment 200, such as a data center. The Network Environment 200 can be used to support a TCP connection for exchanging data between an initiator and a receiver. In some cases, the Network Environment 200 can include a data center, which can support and/or host the cloud 102. The Network Environment 200 can include a Fabric 220 which can represent the physical layer or infrastructure (e.g., underlay) of the Network Environment 200. Fabric 220 can include Spines 202 (e.g., spine routers or switches) and Leafs 204 (e.g., leaf routers or switches) which can be interconnected for routing or switching traffic in the Fabric 220. Spines 202 can interconnect Leafs 204 in the Fabric 220, and Leafs 204 can connect the Fabric 220 to an overlay or logical portion of the Network Environment 200, which can include application services, servers, virtual machines, containers, endpoints, etc. Thus, network connectivity in the Fabric 220 can flow from Spines 202 to Leafs 204, and vice versa. The interconnections between Leafs 204 and Spines 202 can be redundant (e.g., multiple interconnections) to avoid a failure in routing. In some embodiments, Leafs 204 and Spines 202 can be fully connected, such that any given Leaf is connected to each of the Spines 202, and any given Spine is connected to each of the Leafs 204. Leafs 204 can be, for example, top-of-rack ("ToR") switches, aggregation switches, gateways, ingress and/or egress switches, provider edge devices, and/or any other type of routing or switching device.

Leafs 204 can be responsible for routing and/or bridging tenant or customer packets and applying network policies or rules. Network policies and rules can be driven by one or more Controllers 216, and/or implemented or enforced by one or more devices, such as Leafs 204. Leafs 204 can connect other elements to the Fabric 220. For example, Leafs 204 can connect Servers 206, Hypervisors 208, Virtual Machines (VMs) 210, Applications 212, Network Device 214, etc., with Fabric 220. Such elements can reside in one or more logical or virtual layers or networks, such as an overlay network. In some cases, Leafs 204 can encapsulate and decapsulate packets to and from such elements (e.g., Servers 206) in order to enable communications throughout Network Environment 200 and Fabric 220. Leafs 204 can also provide any other devices, services, tenants, or workloads with access to Fabric 220. In some cases, Servers 206 connected to Leafs 204 can similarly encapsulate and decapsulate packets to and from Leafs 204. For example, Servers 206 can include one or more virtual switches or routers or tunnel endpoints for tunneling packets between an overlay or logical layer hosted by, or connected to, Servers 206 and an underlay layer represented by Fabric 220 and accessed via Leafs 204.

Applications 212 can include software applications, services, containers, appliances, functions, service chains, etc. For example, Applications 212 can include a firewall, a database, a CDN server, an IDS/IPS, a deep packet inspection service, a message router, a virtual switch, etc. An application from Applications 212 can be distributed, chained, or hosted by multiple endpoints (e.g., Servers 206, VMs 210, etc.), or may execute or execute entirely from a single endpoint.

VMs 210 can be virtual machines hosted by Hypervisors 208 or virtual machine managers executing on Servers 206. VMs 210 can include workloads executing on a guest operating system on a respective server. Hypervisors 208 can provide a layer of software, firmware, and/or hardware that creates, manages, and/or executes the VMs 210. Hypervisors 208 can allow VMs 210 to share hardware resources on Servers 206, and the hardware resources on Servers 206 to appear as multiple, separate hardware platforms. Moreover, Hypervisors 208 on Servers 206 can host one or more VMs 210.

In some cases, VMs 210 and/or Hypervisors 208 can be migrated to other Servers 206. Servers 206 can similarly be migrated to other locations in Network Environment 200. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 206, Hypervisors 208, and/or VMs 210 can represent or reside in a tenant or customer space. Tenant space can include workloads, services, applications, devices, networks, and/or resources that are associated with one or more clients or subscribers. Accordingly, traffic in Network Environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 216, Servers 206, Leafs 204, etc.

Configurations in Network Environment 200 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 216, which can implement or propagate such configurations through Network Environment 200. In some examples, Controllers 216 can be Application Policy Infrastructure Controllers (APICs) in an ACI framework. In other examples, Controllers 216 can be one or more management components for associated with other SDN solutions, such as NSX Managers.

Such configurations can define rules, policies, priorities, protocols, attributes, objects, etc., for routing and/or classifying traffic in Network Environment 200. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 200, such as Leafs 204, Servers 206, Hypervisors 208, Controllers 216, etc. As previously explained, Network Environment 200 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 200. Endpoints can have one or more attributes such as a VM name, guest OS name, a security tag, application profile, etc. Application configurations can be applied between EPGs, instead of endpoints directly, in the form of contracts. Leafs 204 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can execute on a host, such as a server or switch. For example, an AVS can classify traffic based on specified attributes, and tag packets of different attribute EPGs with different identifiers, such as network segment identifiers (e.g., VLAN ID). Finally, Leafs 204 can tie packets with their attribute EPGs based on their identifiers and enforce policies, which can be implemented and/or managed by one or more Controllers 216. Leaf 204 can classify to which EPG the traffic from a host belongs and enforce policies accordingly.

Another example SDN solution is based on VMWARE NSX. With VMWARE NSX, hosts can execute a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 2A, Network Environment 200 can deploy different hosts via Leafs 204, Servers 206, Hypervisors 208, VMs 210, Applications 212, and Controllers 216, such as VMWARE ESXi hosts, WINDOWS HYPER-V hosts, bare metal physical hosts, etc. Network Environment 200 may interoperate with a variety of Hypervisors 208, Servers 206 (e.g., physical and/or virtual servers), SDN orchestration platforms, etc. Network Environment 200 may implement a declarative model to allow its integration with application design and holistic network policy.

Controllers 216 can provide centralized access to fabric information, application configuration, resource configuration, application-level configuration modeling for a software-defined network (SDN) infrastructure, integration with management systems or servers, etc. Controllers 216 can form a control plane that interfaces with an application plane via northbound APIs and a data plane via southbound APIs.

As previously noted, Controllers 216 can define and manage application-level model(s) for configurations in Network Environment 200. In some cases, application or device configurations can also be managed and/or defined by other components in the network. For example, a hypervisor or virtual appliance, such as a VM or container, can execute a server or management tool to manage software and services in Network Environment 200, including configurations and settings for virtual appliances.

As illustrated above, Network Environment 200 can include one or more different types of SDN solutions, hosts, etc. For the sake of clarity and explanation purposes, various examples in the disclosure will be described with reference to an ACI framework, and Controllers 216 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 206 (e.g., physical or logical), Hypervisors 208, VMs 210, containers (e.g., Applications 212), etc., and can execute or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

Figure 2B:
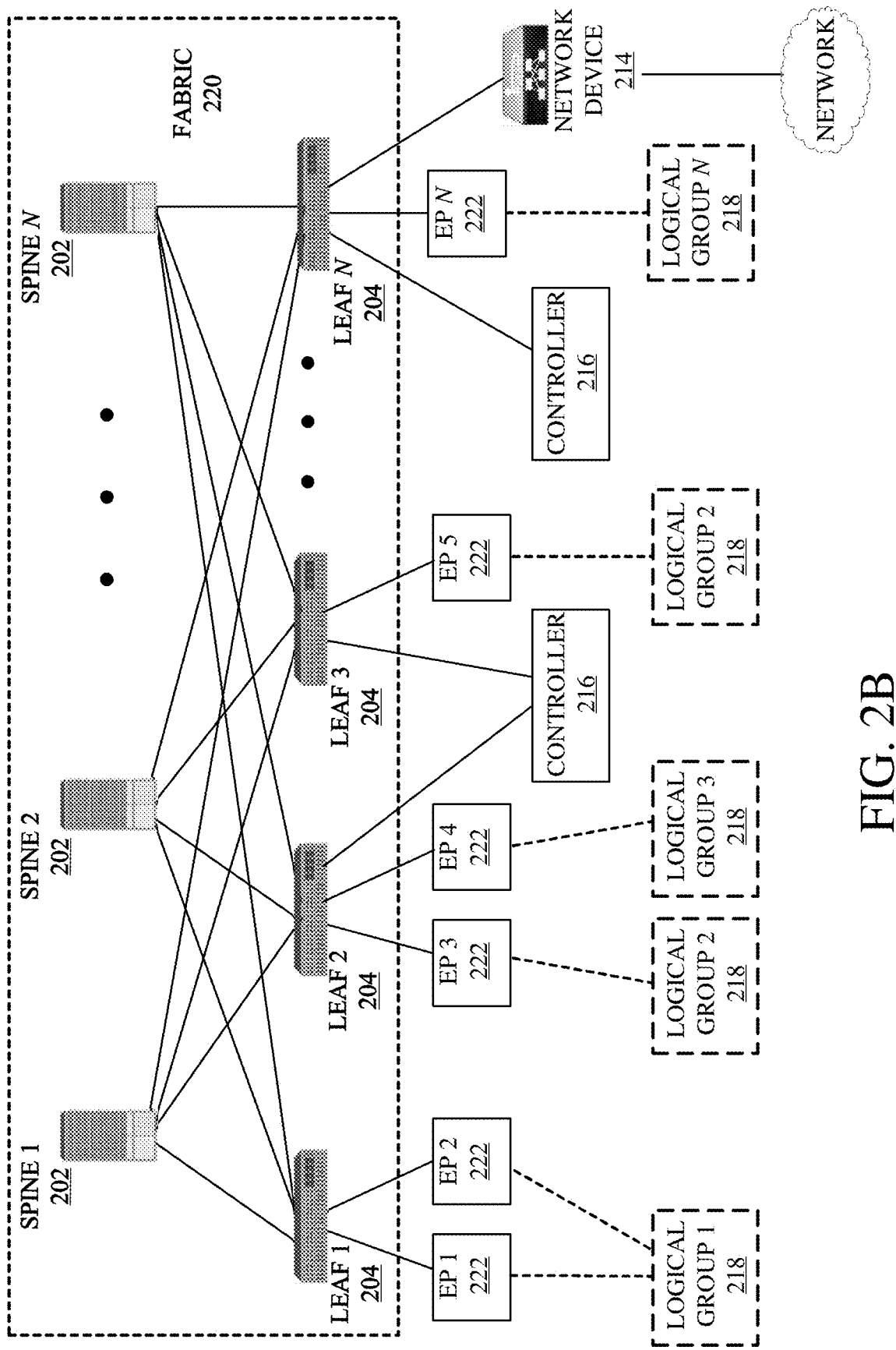
FIG. 2B illustrates another example of a network environment.

FIG. 2B illustrates another example of Network Environment 200. In this example, Network Environment 200 includes Endpoints 222 connected to Leafs 204 in Fabric 220. Endpoints 222 can be physical and/or logical or virtual entities, such as servers, clients, VMs, hypervisors, software containers, applications, resources, network devices, workloads, etc. For example, an Endpoint 222 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container executing a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 222 can be associated with respective Logical Groups 218. Logical Groups 218 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 218 are EPGs in an ACI environment and/or other logical groups (e.g., SGs) in another SDN environment.

Traffic to and/or from Endpoints 222 can be classified, processed, managed, etc., based Logical Groups 218. For example, Logical Groups 218 can be used to classify traffic to or from Endpoints 222, apply policies to traffic to or from Endpoints 222, define relationships between Endpoints 222, define roles of Endpoints 222 (e.g., whether an endpoint consumes or provides a service, etc.), apply rules to traffic to or from Endpoints 222, apply filters or access control lists (ACLs) to traffic to or from Endpoints 222, define communication paths for traffic to or from Endpoints 222, enforce requirements associated with Endpoints 222, implement security and other configurations associated with Endpoints 222, etc.

In an ACI environment, Logical Groups 218 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

Computing nodes in a network environment, e.g. network edge devices, are increasingly using machine learning models to control operation of the nodes and monitor performing of the nodes in the network environment. In particular, machine learning models are trained on telemetry data from computing nodes, e.g. IoT devices, and are configured to act on such telemetry data, e.g. for use in operation of the computing nodes. However, training such models requires a large amount of computational resources. In particular, cloud data centers do not allow for effective centralized training of machine learning models deployed in fog networks due to scaling limits or connectivity restrictions. There therefore exit needs for systems and methods of distributing machine learning model training to network edge devices.

Additionally, telemetry data from computing nodes, e.g. IoT devices, is typically used to train machine learning models, e.g. for monitoring networks. This is problematic when the machine learning models are trained at a centralized location away from a network edge. In particular, the telemetry data is sent from the computing nodes away from the edge of the network, potentially exposing the telemetry data. This presents security concerns that often preclude device owners from sharing telemetry data with outside parties. There therefore exist needs for systems and methods of training machine learning models without exposing telemetry data of computing nodes used to train the machine learning models.

While it is beneficial to distribute machine learning model training to network edge devices, it is difficult to monitor performance of the machine learning models in a distributed manner. Specifically, it is difficult for the network edge devices themselves to effectively evaluate candidate machine learning model deployment and training across the different network edge devices. Additionally, network edge devices in a distributed machine learning model training environment have difficulties determining what machine learning models to actually deploy across the environment based on actual model training in the environment. Specifically, network edge devices have difficulties in performing data pipeline architecture searches (AutoML) for determining new candidate models to deploy into the distributed learning environment based on actual training of models in the environment. There therefore exist needs for systems and methods of centrally monitoring and controlling model training across network edge devices.

The present includes systems, methods, and computer-readable mediums for distributing machine learning model training to network edge devices, while centrally monitoring training of the models and centrally controlling deployment of the models to the network edge devices. A machine learning model architecture to send to network edge devices in a network environment can be generated at a machine learning structure controller. The machine learning model architecture can be deployed to the network edge devices to instantiate and train a machine learning model at the network edge devices in the network environment. Further, performance reports indicating performance of the machine learning model at the network edge devices can be received by the machine learning structure controller from the network edge devices. The machine learning structure controller can determine whether to deploy another machine learning model architecture to the network edge devices based on the performance reports of the machine learning model received from the network edge devices. Subsequently, the machine learning structure controller can deploy the another machine learning model architecture to the network edge devices if it is determined to deploy the architecture based on the performance reports.

FIG. 3 illustrates an example environment 300 for distributing machine learning to edges of a network. The example environment 300 shown in FIG. 3 includes a machine learning structure controller 302 and first network edge device 302-1 . . . N-network edge device 302-N ("network edge devices 304). The environment 300, shown in FIG. 3, can be implemented using one or a combination of the environments and architectures shown in FIGS. 1-2. For example, the machine learning structure controller 302 can be implemented in an applicable cloud computing architecture, such as the cloud computing architecture 100 shown in FIG. 1A. In another example, the network edge devices 304 can be implemented in an applicable fog computing architecture, such as the fog computing architecture 150 shown in FIG. 1B.

A network edge device, as used herein, can include an applicable device for providing an entry point into a network. Specifically, a network edge device can include a client device utilized to grant/obtain network service access to a WAN through LAN. For example, a network edge device can include a computing node, e.g. IoT device, configured to access network services through the Internet. In another example, a network edge device can include an access point, gateway, or router in a LAN configured to provide access to a WAN. Additionally, a network edge device can include a device within a WAN that is configured to provide access to the WAN. For example, a network edge device can include a server in a Fog computing environment configured to provide network service access to clients.

An IoT device, as used herein, includes an applicable device, e.g. network edge device, for sending and/or receiving data over a network. Specifically, an IoT device can include an applicable device for accessing network services through a network, e.g. the Internet. For example, an IoT device can include a desktop computing device, a portable computing device, and other applicable devices that are configured to communicate through a network, e.g. to interview with an external or remote environment.

In the example environment 300 shown in FIG. 3, the machine learning structure controller 302 is configured to distribute machine learning to the network edge devices 304. In distributing machine learning to the network edge devices, the machine learning structure controller 302 can distribute model training of machine learning models to the network edge devices 304. Further, in distributing machine learning model training to the network edge devices 304, the machine learning structure controller 302 can be implemented at a central and remote location from the network edge devices 304. For example the machine learning structure controller 302 can distribute machine learning model training to the network edge devices 304 while the machine learning structure controller 302 is implemented remote from the network edge devices 304, e.g. in a cloud computing environment.

As discussed previously, training machine learning models requires a large amount of computational resources. In particular, training machine learning models based on telemetry data from computing nodes in a network environment consumes a large amount of computational resources due to the large number of computing nodes that exist in typical network environments. This is problematic when the machine learning structure controller 302 is implemented in a centralized location remote from the network edge devices 304, e.g. in a cloud computing environment. Specifically, cloud data centers do not allow for effective centralized training of machine learning models deployed in fog networks due to scaling limits or connectivity restrictions. More specifically, modern fog computing architectures call for reduced data footprints while keeping utilized computational resources and storage local to devices in the fog computing architectures. By distributing machine learning model training to the network edge devices 304, the machine learning structure controller 302 can overcome these problems associated with training machine learning models in a centralized cloud computing environment.

As part of distributing machine learning model training to the network edge devices 304, the machine learning structure controller 302 can generate a first machine learning model architecture 306. A machine learning model architecture, as used herein, can define a structure of a machine learning model and include applicable data for instantiating the machine learning model at a computing node. Specifically, a machine learning model architecture can define a type of machine learning model for instantiation and subsequent training. For example, a machine learning model architecture can define a Random Forest model or a Neural Network model. Additionally, a machine learning model architecture can specify applicable parameters/hyperparameters defining a machine learning model for instantiating the machine learning model at a computing node. For example, a machine learning model architecture can specify a number of trees and a depth of the trees in a Random Forest model. In another example, a machine learning model architecture can define a number of layers, types of activation functions, and regularization strengths for Neural Network models.

The machine learning structure controller 302 can deploy the first machine learning model architecture 306 to the network edge devices 304 after defining the machine learning model architecture 306. The machine learning structure controller 302 can define the first machine learning model architecture 306 as an initial machine learning model architecture for instantiating an initial machine learning model on the network edge devices 304. Subsequently, and as will be discussed in greater detail later, the machine learning structure controller 302 can modify the first machine learning model architecture 306 for instantiating a modified first machine learning model 308 at the network edge devices 304. Alternatively, and as will be discussed in greater detail later, the machine learning structure controller 302 can define a new machine learning model architecture for instantiating a new machine learning model at the network edge devices 304. The machine learning structure controller can define the first, e.g. initial, machine learning model architecture 306 based on characteristics of the network edge devices 304 and/or characteristics of devices that will be used to train the first machine learning model 308. For example, if data of a specific type of IoT device will be used to train the first machine learning model 308, then the machine learning structure controller 302 can define the first machine learning model architecture 306 based on the specific type of IoT device.

The network edge devices 304 can use the first machine learning model architecture 306 to instantiate the first machine learning model 308 at each of the network edge devices 304. Specifically, the network edge devices 304 can each generate separate instances of the first machine learning model 308 at each of the corresponding network edge devices 304. Accordingly, multiple instances of the first machine learning model 308 can be instantiated and execute in parallel across the network edge devices 304.

After instantiating the first machine learning model 308 at each of the network edge devices 304 using the first machine learning model architecture 306, the network edge devices 304 can train corresponding instances of the first machine learning model 308. For example, the first network edge device 304-1 can train a first instance of the first machine learning model 308 at the first network edge device 304-1, while the N network edge device 304-N can train a second instance of the first machine learning model 308 at the N network edge device 304-N. Further in the example, the first network edge device 304-1 can train the first instance of the first machine learning model at the first network edge device 304-1 concurrently with the N network edge device 304-N training the second instance of the first machine learning model 308 at the second network edge device 304-N.

In training the first machine learning model 308 at the network edge devices 304 using the first machine learning model architecture 306, the network edge devices 304 can distribute machine learning, e.g. using the first machine learning model 308, across the network edge devices 304. Similarly, in deploying the first machine learning model architecture 306 to the network edge devices 304 for instantiation and training of the first machine learning model 308, the machine learning structure controller 302 can distribute machine learning to the network edge devices 304. As described previously, this can solve deficiencies, e.g. computational resource usage, when machine learning models are trained at a centralized location, e.g. in a cloud computing environment.

The network edge devices 304 can train the instances of the first machine learning model 308 using telemetry data from applicable computing nodes. For example, the network edge devices 304 can train instances of the first machine learning model 308 at the corresponding network edge devices 304 using telemetry data from applicable computing nodes. Telemetry data can include applicable data related to operation of computing nodes, e.g. operation of IoT devices, in a network environment. For example, if an IoT device is a thermostat, then telemetry data can include measured temperatures at the thermostat over time.

The network edge devices 304 can be the same devices that generate telemetry data used to train machine learning models, e.g. instances of the first machine learning model 308, at the network edge devices 304. For example, the network edge devices 304 can each be computing nodes, e.g. IoT devices, that generate telemetry data for training instances of the first machine learning models 308 at the network edge devices 304. Alternatively, the network edge devices 304 can be different devices from a computing node that generates telemetry data used to train machine learning models, e.g. instances of the first machine learning model 308, at the network edge devices 304. For example, the first network edge device 304-1 can be an access point configured to receive telemetry data from a separate IoT device that is used to train an instance of the first machine learning model 308 at the access point. In another example, the N network edge device 304-N can be a router, e.g. a Cisco® 829 Industrial Integrated Services Router, in an Ethernet backhaul of a LAN configured to receive telemetry data from a separate IoT device that is used to train an instance of the first machine learning model 308 at the router.

The network edge devices 304 can generate first performance reports 310 based on training of the instances of the first machine learning model 308 at the corresponding network edge devices 304. Each of the network edge devices 304 can generate a performance report corresponding to training of an instance of a machine learning model at the corresponding network edge devices 304. For example, the first network edge device 304-1 can generate a first performance report associated with training an instance of the first machine learning model 308 at the first network edge device 304-1. Similarly, the N network edge device 304-N can generate another performance report associated with training another instance of the first machine learning model 308 at the N network edge device 304-N. Subsequently, and as will be discussed in greater detail later, performance reports received from the network edge devices 304 can be used by the machine learning structure controller 302 to determine whether to modify a machine learning model at the network edge devices 304 or deploy a new machine learning model to the network edge devices 304.

A performance report of a machine learning model, as generated by the network edge devices 304, e.g. the first performance reports 310, can include applicable information related to operation and training of instances of a machine learning model at the network edge devices 304. For example, a performance report of an instance of a machine learning model can include how far a model varies while being trained, whether a model stabilizes while being trained, an actual amount of computational resources used in executing the machine learning model, an estimated amount of computational resources used in executing the machine learning model, and an amount of computational resources available at a network edge device, e.g. either a currently amount or an estimated future amount of available computational resources. For example, a performance report can indicate that 50 MB of RAM are estimated for training a model, while 52 MB were actually used to train the model. In another example, each of the network edge devices 304 can estimate how much memory, e.g. how many memory tokens, it can allocate to executing machine learning models, e.g. as will be discussed in greater detail later with respect to experimental machine learning models. Subsequently, the network edge devices 304 can send performance reports indicating how much memory each of the network edge devices 304 can allocate to executing the machine learning models.

The network edge devices 304 can send performance reports, e.g. the first performance reports 310, to the machine learning structure controller 302. The network edge devices 304 can send performance reports to the machine learning structure controller 302 at predefined times. For example, the network edge devices 304 can send the first performance reports 310 to the machine learning structure controller 302 every day. Alternatively, the network edge devices 304 can send performance reports to the machine learning structure controller 302 based on training of machine learning models corresponding to the performance reports. For example, the network edge devices 304 can send the first performance reports 310 once training of the first machine learning model 308 at the network edge devices 304 has stabilized. Stabilization of a machine learning model, as used herein, can include when output created from the machine learning model as a result of training the mode using telemetry data falls within a specific/confined range.

In various embodiments, performance reports, as used herein, do not include telemetry data used to train the machine learning model, e.g. the first machine learning model 308. Specifically, performance reports can include data indicating performance of the machine learning models, e.g. in being trained using telemetry data, without including actual telemetry data itself. This is advantageous as it reduces or otherwise eliminates the risk that telemetry data will be exposed outside of a network edge. As discussed previously, the risk of exposing telemetry data outside of a network edge presents security concerns that often preclude device owners from sharing telemetry data with outside parties. In turn, machine learning model training at network edges can be controlled from a centralized location/network location away from the network edges without risk of exposing telemetry data away from the network edges. Further, as performance reports do not include telemetry data, the amount of data transmitted from the network edge to a centralized location is reduced, thereby conserving network resources.

The machine learning structure controller 302 can use performance reports received from the network edge devices 304 to control training and deployment of machine learning models to the network edge devices 304. Specifically, the machine learning structure controller 302 can use the first performance reports 310 of the instances of the first machine learning model 308 to control training and deployment of either or both the first machine learning model 308 and additional machine learning models at the network edge devices 304.

The machine learning structure controller 302 can be implemented in a centralized network environment remote from the network edge devices 304, e.g. in a cloud environment. Accordingly, the machine learning structure controller 302 can use performance reports received from the network edge devices 304 to centrally control, e.g. from a cloud environment, machine learning model training and deployment at the network edge devices 304. As discussed previously, while it is beneficial to distribute machine learning model training to network edge devices, it is difficult to monitor performance of the machine learning models in a distributed manner. By centrally controlling machine learning model training using the performance reports, the machine learning structure controller 302 can solve the previously described deficiencies of distributing monitoring and control of model training and deployment across network edge devices.

In various embodiments, the machine learning structure controller 302 can be implemented in a fog network environment. Specifically, the machine learning structure controller 302 can be implemented in middle layers of a hierarchical fog network in a distributed fashion. Even when the machine learning structure controller 302 is implemented in a distributed fashion in a hierarchical fog network, it can still be implemented in a centralized network environment location with respect to the network edge. While the compute resources at this level are less than a cloud data center, they are typically much greater than on the network edge. Additionally, multiple distributed machine learning structure controllers 302 in a hierarchical fog network can be used. This can allow for efficient redundancy and failover between controllers. Additionally, this can allow for the complete machine learning model deployment and control process to be contained locally or regionally. This is advantageous in use cases privacy and security is desired in regards to control of the machine learning structure controller 302 functions.

As part of controlling the model training and deployment at the network edge devices 304, the machine learning structure controller 302 can determine whether to deploy another machine learning model architecture/candidate machine learning model architecture to the network edge devices 304 for execution and training of a candidate machine learning model at the network edge devices 304. Specifically, the machine learning structure controller 302 can use the first performance reports 310 of the instances of the first machine learning model 308 to determine whether to deploy a candidate machine learning model architecture to the network edge devices 304. Another/candidate machine learning model architecture can define a new machine learning model or a modified version of a current machine learning model at the network edge devices 304. For example, the machine learning structure controller 302 can determine to deploy a modified machine learning model architecture of the first machine learning model architecture 306, e.g. with modified parameters/hyperparameters, to the network edge devices 304. In another example, the machine learning structure controller 302 can determine to deploy an entirely different machine learning model architecture, in comparison to the first machine learning model architecture 306, to the network edge devices 304.

The machine learning structure controller 302 can determine whether to deploy a candidate machine learning model architecture based on a quality of a machine learning model executing at the network edge devices 304, e.g. as indicated by received performance reports. For example, the machine learning structure controller 302 can determine whether to deploy the second machine learning model architecture 312 to the network edge devices 304 based on a quality of the first machine learning model 308 executing at the network edge devices, e.g. as indicated by the first performance reports 310. Quality of a machine learning model executing at the network edge devices 304 includes applicable characteristics of the machine learning model that quantify the performance of the machine learning model executing at the network edge devices 304. For example, quality of a machine learning model can include an amount of computational resources used to train and execute a model, a speed at which a model is trained and execute, adaptability of a model to variable training data, and other applicable parameters that quantify performance of a machine learning model executing at the network edge devices 304. For example, if a machine learning model at the network edge devices 304 fails to track suspicious traffic passing through the network edge devices 304, e.g. indicating poor quality, then the machine learning structure controller 302 can determine to deploy a new or modified traffic monitoring machine learning model to the network edge devices 304.

The machine learning structure controller 302 can define a candidate machine learning model architecture to deploy to the network edge devices 304. For example, the machine learning structure controller 302 can define a candidate machine learning model architecture, e.g. the second machine learning model architecture 312, to deploy to the network edge devices 304. Further in the example, the second machine learning model architecture 312 can be defined by the machine learning structure controller 302 in response to a determination to deploy a candidate machine learning model architecture to the network edge devices 304 based on the first performance reports.

The machine learning structure controller 302 can use a structure search/machine learning structure search to define a candidate machine learning model architecture for deployment to the network edge devices 304. For example, the machine learning structure controller 302 can use a structure search to define the second machine learning model architecture 312. A structure search, as used herein, can include an applicable machine learning model architecture defining mechanism for defining a machine learning model architecture based on characteristics of other machine learning models/other machine learning model architectures. For example, the machine learning structure controller 302 can apply a structure search to modify values of hyperparameters in an already existing machine learning model architecture. In another example, the machine learning structure controller 302 can apply a structure search to generate a new machine learning model with new hyperparameters based on an already existing machine learning model architecture. An alternative to performing a structure search to define a candidate machine learning model architecture is to simply define candidate machine learning model architectures for all possible permutations of hyperparameters. However, this approach is infeasible as the number of hyperparameters defining a model increases as the model grows in complexity.

The machine learning structure controller 302 can use a structure search to define the second machine learning model architecture 312 based on performance of the first machine learning model 308 at the network edge devices 304. Specifically, the machine learning structure controller 302 can apply a structure search based on the first performance reports 310 of the first machine learning model 308 to define the second machine learning model architecture 312. The second machine learning model architecture can either be a variation of the first machine learning model architecture 306 or an entirely different architecture from the first machine learning model architecture 306.

In various embodiments, the machine learning structure controller 302 is an AutoML structure controller, and the machine learning structure controller 302 is configured to use AutoML to generate a candidate machine learning model architecture. Specifically, the machine learning structure controller 302 can use AutoML to generate the second machine learning model architecture 312. AutoML can be defined as a directed, informed-by-data search in the space of machine learning architectures and data transformation pipelines. AutoML approaches, like Bayesian hyperparameter searches, genetic algorithms, and broader class of evolution strategies, find the optimal architecture for machine learning model architecture and tailor the architecture based on applications of the machine learning model architecture.

The machine learning structure controller 302 can deploy a candidate machine learning model architecture to the network edge devices 304 if it determines to deploy the candidate machine learning model architecture. Specifically, the machine learning structure controller 302 can deploy the second machine learning model architecture 312 to the network edge devices if it determined to deploy the architecture 312 based on the first performance reports 310. Subsequently, the network edge devices 304 can instantiate and train the second machine learning model 314 at the network edge devices 304 based on the second machine learning model architecture 312, similar to as discussed with respect to the first machine learning model 308 and the first machine learning model architecture 306.

The process of determining whether to deploy a candidate machine learning model architecture and subsequently deploying the candidate machine learning model architecture to the network edge devices 304 can be repeated with respect to the second machine learning model 314. Specifically, the network edge devices 304 can send second performance reports 316 of the second machine learning model 314, similar to as discussed with respect to the first machine learning model 308, to the machine learning structure controller 302. Subsequently, the machine learning structure controller 302 can determine whether to deploy a candidate machine learning model architecture for the second machine learning model 314 to the network edge devices 304 based on the second performance reports 316. The machine learning structure controller 302 can then define and deploy the candidate machine learning model architecture for the second machine learning model 314 if it determines to deploy the candidate machine learning model based on the second performance reports 316.

FIG. 4 illustrates a flowchart for an example method of distributing machine learning to a network edge while centrally controlling the machine learning remote from the network edge. The method shown in FIG. 4 is provided by way of example, as there are a variety of ways to carry out the method. Additionally, while the example method is illustrated with a particular order of steps, those of ordinary skill in the art will appreciate that FIG. 4 and the modules shown therein can be executed in any order and can include fewer or more modules than illustrated.

Each module shown in FIG. 4 represents one or more steps, processes, methods or routines in the method.

At step 400, a machine learning model architecture to send to the network edge devices 304 is generated by the machine learning structure controller 302. The machine learning structure controller 302 can be implemented centrally and remote from the network edge devices 304, e.g. in a cloud computing environment. Accordingly, the machine learning model architecture can be generated remote from the network edge device 304, e.g. in the cloud computing environment.

At step 402, the machine learning model architecture is deployed to the network edge devices 304. The network edge devices 304 can use the machine learning model architecture to instantiate and train a machine learning model at the network edge devices 304. Specifically, the network edge devices 304 can use the machine learning model architecture to instantiate and train the machine learning model at the network edge devices 304 using telemetry data from computing nodes.

At step 404, performance reports indicating performance of the machine learning model at the network edge devices 304 are received. Specifically, performance reports of the machine learning model can be received at the machine learning structure controller 302 from the network edge devices 304.

At step 406, the machine learning structure controller 302 determines whether to deploy another machine learning model architecture/candidate machine learning model architecture to the network edge devices 304 based on the performance reports. Specifically, the machine learning structure controller 302 can determine whether to deploy the candidate machine learning model architecture based on a quality of the machine learning model at the network edge devices 304, as indicated by the performance reports.

At step 408, the machine learning structure controller 302 deploys the another machine learning model architecture to the network edge devices 304, if it is determined to deploy the another machine learning model architecture based on the performance reports. Subsequently, the network edge devices 304 can instantiate and train the another machine learning model using the another machine learning model architecture.

FIG. 5 illustrates an example environment 500 for distributing machine learning to edges of a network using experimental machine learning models. In the example environment 500 shown in FIG. 5, the machine learning structure controller 302 deploys both a first machine learning model architecture 502 and an experimental machine learning model architecture 504 to the network edge devices 304. The first machine learning model architecture 502 and the experimental machine learning model architecture 504 can be different versions of the same experimental machine learning model architecture. Alternatively, the first machine learning model architecture 502 and the experimental machine learning model architecture 504 can be different experimental machine learning model architectures.

The experimental machine learning model architecture 504 can be defined based on executing of other machine learning models at the network edge devices 304. For example, the experimental machine learning model architecture 504 can be a different version of a machine learning model executing at the network edge devices 304. In another example, the experimental machine learning model architecture 504 can be a different machine learning model from a machine learning model executing at the network edge devices 304. Specifically, the experimental machine learning model architecture 504 can be defined based on a structure search, e.g. AutoML, using performance reports of a machine learning model executing at the network edge devices 304. In particular, the experimental machine learning model architecture 504 can be the second machine learning model architecture 312 defined based on the first performance reports 310 of the first machine learning model 308 executing at the network devices 304.

In various embodiments, the machine learning structure controller 302 can schedule deployment of the experimental machine learning model architecture 504 based on an estimate of edge device resources needed by the network edge devices 304 to execute the experimental machine learning model 508. Specifically, the network edge devices 304 can each estimate an amount of edge resources available to instantiate and train machine learning models, e.g. the experimental machine learning model 508, at the network edge devices 304. In turn, the network edge devices 304 can each allocate the available edge resources to executing the machine learning models at the network edge devices 304. For example, if a network edge device determines that it has 128 MB of RAM available for executing machine learning models, then the network edge device can allocate the 128 MB of RAM, e.g. 128 memory tokens, for executing the machine learning models at the network edge device. Also, the network edge devices 304 can each communicate to the machine learning structure controller 302, e.g. through performance reports, the amount of available resources the network edge devices 304 have available for executing machine learning models.

Similarly, the machine learning structure controller 302 can also estimate an amount of edge device resources needed to execute the experimental machine learning model 508 at the network edge devices 304. Specifically, the machine learning structure controller 302 can use a resource estimation model to estimate an amount of edge resources needed to execute the experimental machine learning model 508 at the network edge devices 304. The resource estimation module can receive the experimental machine learning model architecture 504, e.g. the number of layers, number of logits, and other defining characteristics of the experimental machine learning model 508, as input. Subsequently, the resource estimation model can output the estimated resource requirements for executing the experimental machine learning model 508 based on the inputted experimental machine learning model architecture 504.

The machine learning structure controller 302 can compare the resources available at the network edge devices 304, as estimated by the network edge devices 304, to the estimated resources needed to execute the experimental machine learning model 508, to schedule deployment of the experimental machine learning model architecture 504 to the network edge devices 304. In scheduling deployment of the experimental machine learning model architecture 504, the machine learning structure controller 302 can actually select network edge devices for receiving the experimental machine learning model architecture 504. For example, the machine learning structure controller 302 can identify which network edge devices have available resources to execute the experimental machine learning model 508 and subsequently deploy the experimental machine learning model architecture 504 to the network edge devices that have the available resources to train the model 508. Accordingly, the machine learning structure controller 302 can solve linear scheduling problems associated with deploying experimental machine learning model architectures to the network edge devices 304.

The machine learning structure controller 302 can identify an estimated number of the network edge devices 304 that will drop instantiation and training of the experimental machine learning model 508 due to a lack of available edge device resources. Specifically, based on the estimated available resources at the network edge devices 304 and the estimated resources needed to execute the experimental machine learning model 508 the machine learning structure controller 302 can estimate a number of the network edge devices 304 that will drop the experimental machine learning model 508, e.g. due to a lack of resourced available to execute the model 508. Subsequently, the machine learning structure controller 302 can deploy the experimental machine learning model architecture 504 based on the estimated number of network edge devices 304 that will drop the experimental machine learning model 508. For example, if k devices are expected to drop the experimental machine learning model 508, then the machine learning structure controller 302 can deploy the experimental machine learning model architecture 504 to N+k network edge devices 304. N can include the number of the network edge devices 304 needed to execute the experimental machine learning model 508 to validate the experimental machine learning model 508 in comparison to the first machine learning model 506. While the network edge devices 304 are described as dropping machine learning models when they lack resources to execute the models, in various embodiments, the network edge devices 304 can pause execution of the models when resources execute out. As follows, the network edge devices 304 can resume executing the models when resources are available.

The network edge devices 304 can used the first machine learning model architecture 502 and the experimental machine learning model architecture 504 to instantiate and train the first machine learning model 506 and the experimental machine learning model 508 at the network edge devices 304. Similar to as discussed with respect to the first machine learning model 308 in the example environment 300 shown in FIG. 3, the network edge devices 304 can each train the first machine learning model 506 and the experimental machine learning model 508 at the corresponding network edge devices 304 using telemetry data. Specifically, the network edge devices 304 can each train the first machine learning model 506 and the experimental machine learning model 508 at the corresponding network edge devices 304 using telemetry data from a computing node, e.g. IoT device, in the environment 300.

In turn, the network edge devices 304 can compare the performances of the first machine learning model 506 and the experimental machine learning model 508 at each of the corresponding network edge devices 304. Specifically, the network edge devices 304 can compare the performances of the first machine learning model 506 and the experimental machine learning model 508 to identify whether the experimental machine learning model 508 performs better or worse than the first machine learning model 506. Additionally, the network edge devices 304 can compare the performances of the first machine learning model 506 and the experimental machine learning model 508 to identify how much better or worse the experimental machine learning model 508 performs with respect to the first machine learning model 506. In comparing the first machine learning model 506 and the experimental machine learning model 508 based on performance, the network edge devices 304 can compare the models 506 and 508 based on corresponding qualities of the machine learning models 506 and 508 executing at the network edge devices 304. As discussed previously, quality of a machine learning model executing at the network edge devices 304 includes applicable characteristics of the machine learning model that quantify the performance of the machine learning model executing at the network edge devices 304.

The network edge devices 304 can compare outputs of the first machine learning model 506 and the experimental machine learning model 508 at the network edge devices 304 to compare performances of the respective models 506 and 508. Specifically, the network edge devices 304 can use validators to compare the outputs of the first machine learning model 506 and the experimental machine learning model 508. For example, the network edge devices 304 can use validators to determine whether the experimental machine learning model 508 performs better than the first machine learning model 506 based on output of the first machine learning model 506 and the experimental machine learning model 508. Validating the same architectures across multiple devices, potentially all at once, helps to ensure that observed performance improvements, which are ultimately implemented through management of the machine learning models/architectures, are robust enough to handle environment and telemetry profile variations. Further, by validating across multiple network edge devices allows for testing of multiple experimental models simultaneously. In turn, the efficiency of architecture searches scales linearly with the number of network edge devices and is not bottlenecked by computing resources in a cloud environment or by network bandwidth limitations.

Further, the network edge devices 304 can generate performance reports 510 based on the comparison of the first machine learning model 506 with the experimental machine learning model 508. The performance reports 510 can indicate whether the experimental machine learning model 508 performed better or worse than the first machine learning model 506. Additionally, the performance reports 510 can indicate whether how much better or worse the experimental machine learning model 508 performed when compared to the performance of the first machine learning model 506.

The machine learning structure controller 302 can manage machine learning model training and instantiation at network edge devices based on the comparison of the experimental machine learning model 508 with the first machine learning model 506, e.g. as indicated by the performance reports 510. Specifically, if the experimental machine learning model 508 outperforms the first machine learning model 506, then the machine learning structure controller 302 can deploy the experimental machine learning model architecture 504 to additional network edge devices to replace the first machine learning model 506. Further, if the experimental machine learning model 508 outperforms the first machine learning model 506 then the machine learning structure controller 302 can instruct the network edge devices 304 to discard the first machine learning model 506 and replace it with the experimental machine learning model 508. In various embodiments, the machine learning structure controller 302 can manage machine learning models at network edge devices based on whether a specific number of the network edge devices 304 report, e.g. through the performance reports 510, that the experimental machine learning model 508 outperformed the first machine learning model 506. For example, if 80% of the network edge devices 304 report that the experimental machine learning model 508 outperformed the first machine learning model 506, then the machine learning structure controller 302 can deploy the experimental machine learning model architecture 504 to additional network edge devices.

The machine learning structure controller 302 can use a machine learning structure search to managing machine learning model training and instantiation at network edge devices based on the comparison between the first machine learning model 506 and the experimental machine learning model 508. Specifically, the machine learning structure controller 302 can use a machine learning structure search to modify the experimental machine learning model architecture 504 if the experimental machine learning model 508 is performing worse than the first machine learning model 506. Additionally, the machine learning structure controller 302 can use a machine learning structure search to define a new experimental machine learning model architecture if the experimental machine learning model 508 is performing worse than the first machine learning model 506. Subsequently, the machine learning structure controller 302 can deploy the modified experimental machine learning model architecture 504 or new experimental machine learning model architecture to the network edge devices 304.

In various embodiments, the performance reports 510 can indicate an actual amount of resources used by the network edge devices 304 to instantiate and train the experimental machine learning model 508 at the network edge devices 304. Subsequently, the machine learning structure controller 302 can control deployment of the experimental machine learning model architecture 504 to the network edge devices 304 based on the actual amount of resources used to instantiate and train the experimental machine learning model 508. Specifically, the machine learning structure controller can update the resource estimation model for estimating resources needed to execute the experimental machine learning model 508 based on the actual amount of resources used to execute the model 508 at the network edge devices 304. In turn, the machine learning structure controller 302 can schedule deployment of the experimental machine learning model architecture 504 based on updated resource requirements identified by the updated resource estimation model.

In various embodiments, one of the network edge devices 304, e.g. the first network edge device 304-1, is deployed and configured to execute machine learning models while refraining from performing traditional/intended functions of the network edge devices 304. For example, the first network edge device 304-1 can be a Cisco® 809/829 gateway that is configured to use all or most of its computing resources to train and execute machine learning models while refraining from providing traditional gateway functions. Further, the first network edge device 304-1 can be deployed with a second network edge device, e.g. the same type of network device. As follows, the first network edge device 304-1 can be configured to just perform model training, while the second network edge device can be configured to handle all of the traditional gateway functions, including the gateway functions of the first network edge device 304-1. This can further ensure redundancy in a network environment. For example if the second network edge device fails, then the first network edge device 304-1 can take over the gateway functionalities performed by the second network edge device.

FIG. 6 illustrates a computing system architecture 600 wherein the components of the system are in electrical communication with each other using a connection 605, such as a bus. Exemplary system 600 includes a processing unit (CPU or processor) 610 and a system connection 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware or software service, such as service 1 632, service 2 634, and service 3 636 stored in storage device 630, configured to control the processor 610 as well as a special-purpose processor where software instructions are incorporated into the actual processor design. The processor 610 may be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include services 632, 634, 636 for controlling the processor 610. Other hardware or software modules are contemplated. The storage device 630 can be connected to the system connection 605. In one aspect, a hardware module that performs a particular function can include the software component stored in a computer-readable medium in connection with the necessary hardware components, such as the processor 610, connection 605, output device 635, and so forth, to carry out the function.

FIG. 7 illustrates an example network device 700 suitable for performing switching, routing, load balancing, and other networking operations. Network device 700 includes a central processing unit (CPU) 704, interfaces 702, and a bus 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL X86 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 704 to efficiently perform routing computations, network diagnostics, security functions, etc.

Although the system shown in FIG. 7 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC), which can be configured to perform routing and/or switching operations. The ASIC can communicate with other components in the network device 700 via the bus 1010, to exchange data and signals and coordinate various types of operations by the network device 700, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
generating, at a machine learning structure controller, a machine learning model architecture to send to network edge devices in a network environment;
deploying the machine learning model architecture to the network edge devices, wherein the network edge devices utilize the machine learning model architecture to instantiate and train a machine learning model at the network edge devices in the network environment;
receiving, at the machine learning structure controller from the network edge devices, training performance reports indicating performance of the network edge devices in training the machine learning model at the network edge devices;
determining whether to deploy another machine learning model architecture to the network edge devices based on the training performance reports of the machine learning model received from the network edge devices; and
deploying the another machine learning model architecture to the network edge devices if it is determined to deploy the another machine learning model architecture to the network edge devices based on the training performance reports.

2. The method of claim 1, wherein the another machine learning model architecture is an architecture for a different machine learning model than the machine learning model instantiated and trained according to the machine learning model architecture.

3. The method of claim 1, wherein the another machine learning model architecture is an architecture for the same machine learning model instantiated and trained according to the machine learning model architecture with varying hyperparameters of the machine learning model.

4. The method of claim 1, wherein the machine learning structure controller is further configured to determine the another machine learning model architecture using a machine learning structure search performed based on the performance reports of the machine learning model received from the network edge devices.

5. The method of claim 4, wherein the machine learning structure controller is an AutoML structure controller and the AutoML structure controller is configured to use AutoML to generate the another machine learning model architecture based on the performance reports of the machine learning model received from the network edge devices.

6. The method of claim 1, wherein the network edge devices include IoT devices in the network environment.

7. The method of claim 1, wherein the machine learning structure controller is implemented remote from the network edge devices in the network environment.

8. The method of claim 1, wherein the network edge devices are configured to generate the performance reports of the machine learning model at the network edge devices by:
instantiating one or more experimental machine learning models at the network edge devices using one or more experimental machine learning model architectures;
training the one or more experimental machine learning models with telemetry data used to train the machine learning model instantiated at the network edge devices; and
comparing output of the one or more experimental machine learning models with output of the machine learning model to generate the performance reports of the machine learning model.

9. The method of claim 8, wherein the performance reports of the machine learning model do not include the telemetry data used to train the machine learning model and the one or more experimental machine learning models.

10. The method of claim 8, wherein at least one of the one or more experimental machine learning models are defined by experimental machine learning model architectures generated by the machine learning structure controller based on performance reports of one or more machine learning models instantiated and trained at the network edge devices.

11. The method of claim 8, wherein the one or more experimental machine learning models are defined by the another machine learning model, and the another machine learning model architecture is deployed to the network edge devices for instantiating and training the another machine learning model as part of instantiating and training the one or more experimental machine learning models.

12. The method of claim 8, further comprising:
estimating, by the network edge devices, an available amount of edge device resources available to instantiate and train the one or more experimental machine learning models at the network edge devices;
estimating, by the machine learning structure controller using a resource estimation module, an estimated amount of edge device resources for instantiating and training the one or more experimental machine learning models at the network edge devices; and
scheduling, by the machine learning structure controller, deployment of the one or more experimental machine learning architectures to the network edge devices based on a comparison of the available amount of edge device resources and the estimated amount of edge device resources.

13. The method of claim 12, further comprising:
receiving, by the machine learning structure controller, an actual amount of edge device resources used to instantiate and train the one or more experimental machine learning models at the network edge devices;
modifying the resource estimation module based on the actual amount of edge device resources to create a modified resource estimation module; and
scheduling, by the machine learning structure controller, deployment of the one or more experimental machine learning architectures to the network edge devices based on the modified resource estimation model.

14. The method of claim 12, further comprising:
identifying an estimated number of the network edge devices that will drop instantiation and training of the one or more experimental machine learning models from a lack of available edge device resources; and
selecting a number of the network edge devices for deployment of the one or more experimental machine learning model architectures based on the estimated number of the network edge devices that will drop instantiation and training of the one or more machine learning model architectures.

15. A system comprising:
one or more processors; and
at least one computer-readable storage medium having stored therein instructions which, when executed by the one or more processors, cause the one or more processors to perform operations comprising:

generating, at a machine learning structure controller, a machine learning model architecture to send to network edge devices in a network environment, wherein the network edge devices include IoT devices in the network environment;

deploying the machine learning model architecture to the network edge devices, wherein the network edge devices utilize the machine learning model architecture to instantiate and train a machine learning model at the network edge devices in the network environment;

receiving, at the machine learning structure controller from the network edge devices, training performance reports indicating performance of the network edge devices in training the machine learning model at the network edge devices;

determining whether to deploy another machine learning model architecture to the network edge devices based on the training performance reports of the machine learning model received from the network edge devices; and deploying the another machine learning model architecture to the network edge devices if it is determined to deploy the another machine learning model architecture to the network edge devices based on the training performance reports.

16. The system of claim 15, wherein the machine learning structure controller is further configured to determine the another machine learning model architecture using a machine learning structure search performed based on the performance reports of the machine learning model received from the network edge devices.

17. The system of claim 15, wherein the instructions which, when executed by the one or more processors, further cause the one or more processors to perform operations comprising:

instantiating one or more experimental machine learning models at the network edge devices using one or more experimental machine learning model architectures;

training the one or more experimental machine learning models with telemetry data used to train the machine learning model instantiated at the network edge devices; and comparing output of the one or more experimental machine learning models with output of the machine learning model to generate the performance reports of the machine learning model.

18. The system of claim 17, wherein the performance reports of the machine learning model do not include the telemetry data used to train the machine learning model and the one or more experimental models.

19. The system of claim 17, wherein the instructions which, when executed by the one or more processors, further cause the one or more processors to perform operations comprising:

estimating, by the network edge devices, an available amount of edge device resources available to instantiate and train the one or more experimental machine learning models at the network edge devices;

estimating, by the machine learning structure controller using a resource estimation module, an estimated amount of edge device resources for instantiating and training the one or more experimental machine learning models at the network edge devices; and scheduling, by the machine learning structure controller, deployment of the one or more experimental machine learning architectures to the network edge devices based on a comparison of the available amount of edge device resources and the estimated amount of edge device resources.

20. A non-transitory computer-readable storage medium having stored therein instructions which, when executed by a processor, cause the processor to perform operations comprising:

generating, at a machine learning structure controller, a machine learning model architecture to send to network edge devices in a network environment;

deploying the machine learning model architecture to the network edge devices, wherein the network edge devices utilize the machine learning model architecture to instantiate and train a machine learning model at the network edge devices in the network environment;

receiving, at the machine learning structure controller from the network edge devices, training performance reports indicating performance of the network edge devices in training the machine learning model at the network edge devices;

determining whether to deploy another machine learning model architecture to the network edge devices based on the training performance reports of the machine learning model received from the network edge devices, wherein the another machine learning model architecture is an architecture for a different machine learning model than the machine learning model; and deploying the another machine learning model architecture to the network edge devices if it is determined to deploy the another machine learning model architecture to the network edge devices based on the training performance reports.

* * * * *